United States Patent
Kawamoto

(10) Patent No.: US 12,523,291 B2
(45) Date of Patent: Jan. 13, 2026

(54) CONTROL DEVICE FOR VEHICLE

(71) Applicant: TOYOTA JIDOSHA KABUSHIKI KAISHA, Toyota (JP)

(72) Inventor: Shotaro Kawamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/964,061

(22) Filed: Nov. 29, 2024

(65) Prior Publication Data

US 2025/0243930 A1    Jul. 31, 2025

(30) Foreign Application Priority Data

Jan. 29, 2024   (JP) ................. 2024-011325

(51) Int. Cl.
*F16H 61/12*    (2010.01)
*F16H 59/10*    (2006.01)
*F16H 59/02*    (2006.01)
*F16H 61/22*    (2006.01)

(52) U.S. Cl.
CPC ........... *F16H 61/12* (2013.01); *F16H 59/105* (2013.01); *F16H 2059/0282* (2013.01); *F16H 2061/122* (2013.01); *F16H 2061/1284* (2013.01); *F16H 2061/223* (2013.01)

(58) Field of Classification Search
None
See application file for complete search history.

(56) References Cited

U.S. PATENT DOCUMENTS

2001/0029414 A1* 10/2001 Nada ............... B60L 50/16
                                                 701/29.7
2005/0126322 A1*  6/2005 Kozaki ........... F16H 59/105
                                                   74/335

FOREIGN PATENT DOCUMENTS

JP          2023-132851 A      9/2023

* cited by examiner

*Primary Examiner* — Minnah L Seoh
*Assistant Examiner* — Gregory T Prather
(74) *Attorney, Agent, or Firm* — SoraIP, Inc.

(57) ABSTRACT

A shift position is determined based on signals of a plurality of electrical contacts that is provided with a lock mechanism configured to be able to switch between a P lock that regulates switching of the shift operation unit from the P position and an N lock that regulates switching of the shift operation unit from the N position and to release the set P lock or N lock by operating the brake operation unit, and outputs a signal corresponding to the position of the shift operation unit, and when no on signal is output from all of the electrical contacts, a shift position is determined based on signals of a first switch in which the shift operation unit is turned on in the P position and the N position, and a second switch in which the shift operation unit is turned on in the P position.

4 Claims, 3 Drawing Sheets

FIG. 3

| SHIFT LEVER POSITION | BRAKING OFF | BRAKING ON |
|---|---|---|
| P POSITION | P LOCK (N UNLOCK) | UNLOCK P (N LOCK) |
| N POSITIONS | N LOCK (P UNLOCK) | N UNLOCK (P LOCK) |
| R OR D POSITION | P LOCK (N UNLOCK) | P LOCK (N UNLOCK) |

FIG. 4

| ELECTRICAL CONTACTS | | | | JUDGEMENT SHIFT POSITION |
|---|---|---|---|---|
| P | R | N | D | |
| ON | OFF | OFF | OFF | P |
| OFF | ON | OFF | OFF | R |
| OFF | OFF | ON | OFF | N |
| OFF | OFF | OFF | ON | D |

FIG. 5

| | ELECTRICAL CONTACTS | | | | N SW | P SW |
|---|---|---|---|---|---|---|
| | P | R | N | D | | |
| ON CONDITION 1 | ON | — | — | — | — | — |
| ON CONDITION 2 | — | — | — | — | — | ON |
| OFF CONDITION 1 | OFF | ON | — | — | — | OFF |
| OFF CONDITION 2 | OFF | — | ON | — | ON | OFF |
| OFF CONDITION 3 | OFF | — | — | ON | — | OFF |

※ 「—」: NO QUESTION

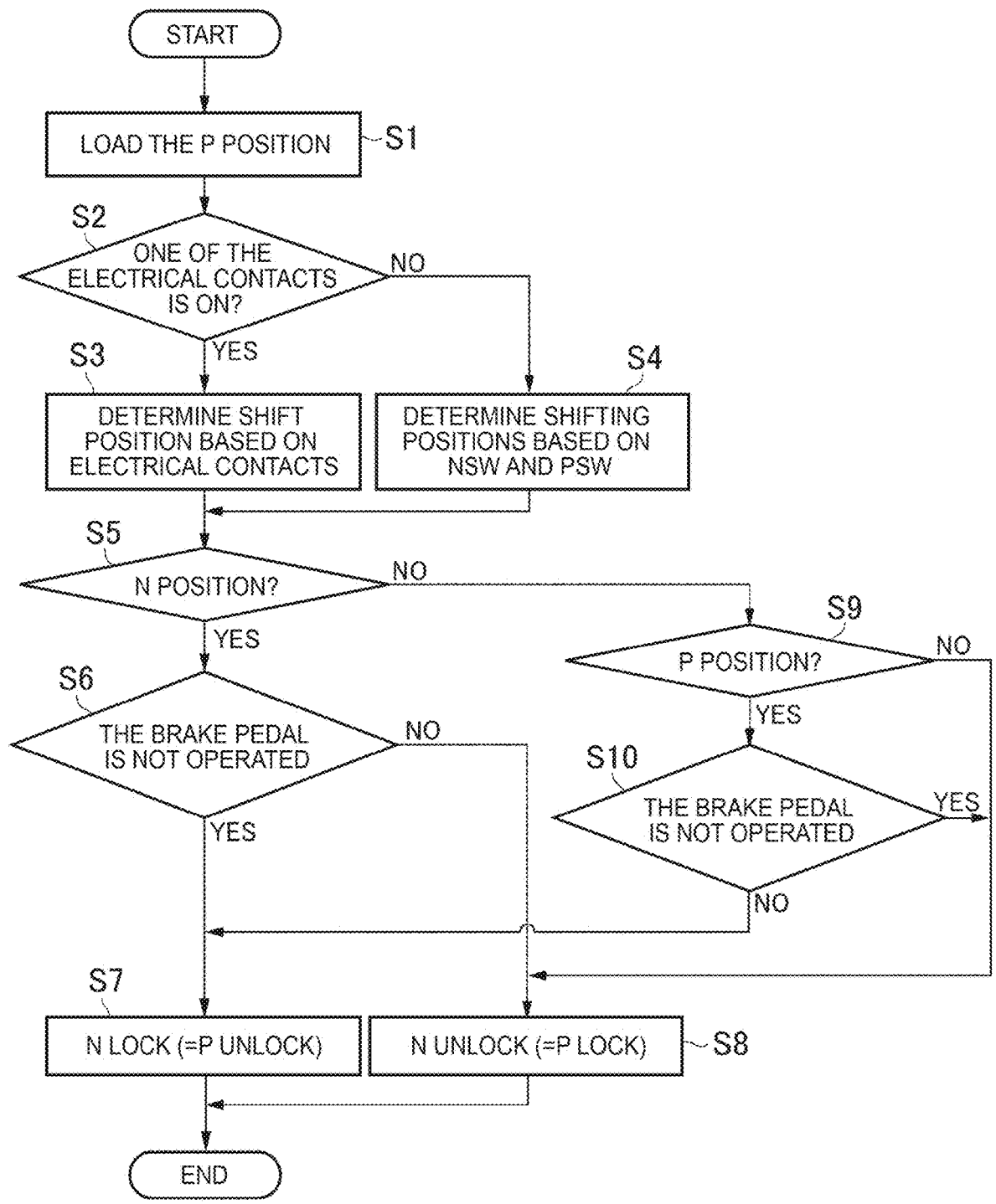

CONTROL DEVICE FOR VEHICLE

CROSS-REFERENCE TO RELATED APPLICATION

This application claims priority to Japanese Patent Application No. 2024-011325 filed on Jan. 29, 2024, incorporated herein by reference in its entirety.

BACKGROUND

1. Technical Field

The disclosure relates to a device for controlling a vehicle based on a shift position selected from a plurality of shift positions including a parking position, a traveling position, and a neutral position, in accordance with a shift operation performed by a driver.

2. Description of Related Art

Japanese Unexamined Patent Application Publication No. 2023-132851 (JP 2023-132851 A) describes a control device for a vehicle, which is capable of suppressing unintended takeoff of the vehicle even when a failure occurs in an electrical contact of a shift position of an automatic transmission using a mechanical shift lever. The mechanical shift lever described in JP 2023-132851 A is provided with a lock mechanism that regulates switching from a parking position or a neutral position to another shift position in a state in which a braking device is not operated. The lock mechanism is configured to set one of a parking lock (hereinafter "P lock") that regulates switching from the parking position and a neutral lock (hereinafter "N lock") that regulates switching from the neutral position. The control device described in JP 2023-132851 A is configured to control the lock mechanism so as to regulate switching from the parking position when the electrical contact is determined to have failed and also the braking device is not operated, and to interrupt transmission of power between a drive power source and drive wheels of the vehicle.

Note that, the control device described in JP 2023-132851 A is configured such that when the electrical contacts are all off due to a malfunction in which the electrical contact corresponding to the position of the shift lever not going to on occurring, and the braking device is not operated, P lock is implemented.

SUMMARY

As described above, the control device described in JP 2023-132851 A is configured such that, when a malfunction occurs in which the electrical contact for detecting the neutral position (N contact) does not go on, the shift lever is in the neutral position, and the braking device is not operated, N lock is disengaged. Accordingly, when the shift lever is in the neutral position, there is a possibility that the shift lever will be movable from the neutral position, even though the braking device is not operated.

The disclosure has been conceived in light of the foregoing technical issue, and an object thereof is to provide a control device of a vehicle that is capable of suppressing a shift device from being switched from a neutral position in a state in which a braking device is not operated.

In order to achieve the above object, an aspect of the disclosure is a control device for a vehicle. The vehicle includes a shift operation unit for selecting a plurality of shift positions including a parking position,
a neutral position, and a drive position,
a plurality of electrical contacts including a parking contact that is turned on when the shift operation unit is in the parking position, a neutral contact that is turned on when the shift operation unit is in the neutral position, and a drive contact that is turned on when the shift operation unit is in the drive position,
a lock mechanism that is configured to be switchable between a parking position lock that regulates or restricts switching of the shift operation unit from the parking position to another shift position, and a neutral position lock that regulates or restricts switching of the shift operation unit from the neutral position to another shift position, and
a brake operation unit that is operated by a driver to apply a braking force to wheels, in which the lock mechanism is configured to disengage the parking position lock or the neutral position lock that is set, by operating the brake operation unit.

The control device includes a first switch that is turned on when the shift operation unit is at the parking position or the neutral position, a second switch that is only turned on when the shift operation unit is in the parking position, and a controller that controls the locking mechanism in accordance with the shift position.

The controller includes
a normal determination unit that, when an on signal is output from any one of the electrical contacts, determines the shift position of the shift operation unit based on the on signal of the electrical contact, and
a backup determination unit that, when an on signal is not output from any of the electrical contacts, determines the shift position of the shift operation unit based on signals of the first switch and the second switch.

Also, when an on signal is output from the first switch and also an on signal is not output from the second switch, the backup determination unit according to the disclosure may determine that the shift operation unit is in the neutral position.

Also, the backup determination unit according to the disclosure may include a parking history update map, in which an operation history of the shift operation unit being operated to the parking position is stored when the parking contact is on or when the second switch is on, and from which the operation history is deleted when the parking contact and the second switch are off and also the drive contact is on, or when the parking contact and the second switch are off and also the first switch and the neutral contact are on, and the backup determination unit may determine the shift position of the shift operation unit based on the operation history that is stored based on the parking history update map, and on a signal input from the first switch.

Also, the controller according to the disclosure may further include a lock determination unit that is configured to disengage one of the parking position lock and the neutral position lock by the lock mechanism, based on the shift position determined based on either the normal determination unit or the backup determination unit, and presence or absence of an operation of the brake operation unit, and also to execute the other of the parking position lock and the neutral position lock.

The control device according to the disclosure is provided with the electrical contacts for outputting the on signal in accordance with each position of the shift operation unit, and determines the shift position of the shift operation unit based on the on signal of the electrical contact when the on signal is output from any one of the electrical contacts. Also, the control device further includes the first switch that is turned on at the parking position and the neutral position of the shift operation unit, and the second switch that is turned on only at the parking position of the shift operation unit, and when the on signal is not output from any of the electrical contacts, the shift position of the shift operation unit is determined based on the signals of the first switch and the second switch.

That is to say, for example, when an on signal is not input to the controller from any the electrical contacts, such as when a failure occurs in which an on signal is not output from the neutral contact in a state in which the shift operation unit is positioned at the neutral position, or when a failure occurs in which an on signal is not output from the parking contact in a state in which the shift operation unit is positioned at the parking position, or the like, the shift position is determined based on the signals of the first switch and the second switch.

Accordingly, even when a failure occurs in which an on signal cannot be output from the electrical contacts for detecting the shift position, at least the parking position and the neutral position can be determined based on signals input to the controller from the first switch and the second switch. That is to say, a locked state (parking position lock or neutral position lock) of the lock mechanism can be switched as appropriate by positioning the shift operation unit in the parking position or the neutral position. Accordingly, the shift operation unit can be suppressed from moving from the parking position or the neutral position to another shift position without operation of the brake operation unit being performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram showing a P lock and an N lock corresponding to the position of a shift lever and the presence or absence of an operation of a brake pedal;

FIG. 4 is a diagram illustrating an example of a shift position determination map;

FIG. 5 is a diagram illustrating an exemplary PSW history updating map; and

FIG. 6 is a flowchart illustrating an example of control executed by the control device according to the embodiment of the present disclosure.

DETAILED DESCRIPTION OF EMBODIMENTS

An embodiment of the present disclosure will be described with reference to the drawings. The embodiment to be shown below is merely an example of embodying the present disclosure and therefore does not limit the disclosure.

Figure 1:
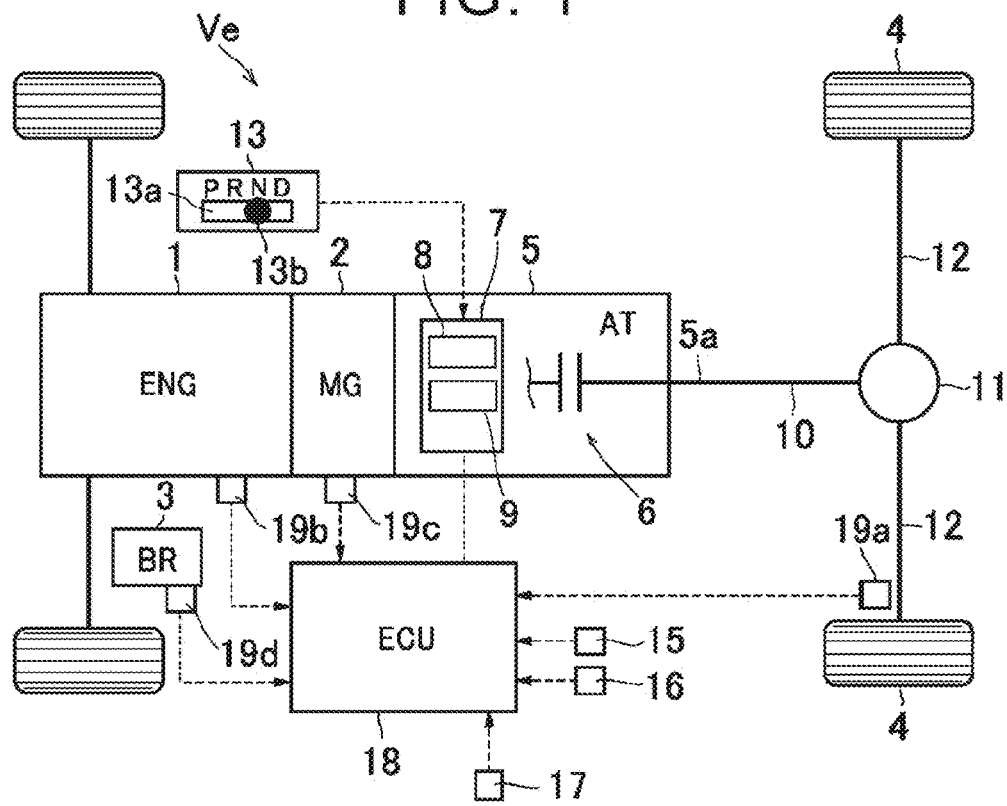
FIG. 1 is a diagram for explaining an example of a vehicle according to an embodiment of the present disclosure, and is a diagram schematically illustrating an example of a configuration and a control system of the vehicle.

FIG. 1 schematically illustrates an example of a vehicle according to an embodiment of the present disclosure. The vehicle Ve shown in FIG. 1 includes an engine (ENG) 1 as a driving force source, a motor (MG) 2, a brake pedal (BR) 3 operated by a driver to decelerate or stop the vehicle Ve, and an automatic transmission 5 for changing a rotational speed ratio (gear ratio) between the drive power sources 1 and 2 and the drive wheels 4.

The engine 1 is, for example, an internal combustion engine such as a gasoline engine or a diesel engine, and is configured to electrically control an operation state such as adjustment of an output and start and stop. In the case of a gasoline engine, the opening degree, the fuel injection amount, the ignition timing, and the like of the throttle valve are electrically controlled. Further, in the case of a diesel engine, the fuel injection quantity, the injection timing of the fuel, the opening degree of EGR bulb, and the like are electrically controlled.

The motor 2 is constituted by a motor generator capable of functioning as a generator for converting mechanical energy into electrical energy in addition to functioning as a prime mover for converting electrical energy into mechanical energy. Specifically, the motor 2 is caused to function as a prime mover by controlling an inverter (not shown) so that electric power is supplied from a battery (not shown) to the motor 2. In addition, by controlling the inverter so as to output the braking torque from the motor 2, the motor 2 is made to function as a generator, so that the battery can be charged. Such a motor 2 can be constituted by, for example, a permanent magnet synchronous motor, an induction motor, or the like.

Note that the vehicle Ve targeted in the embodiment of the present disclosure is not limited to hybrid electric vehicle illustrated in FIG. 1 in which the engine 1 and the motor 2 are mounted as the drive power sources. For example, a typical engine vehicle in which only the engine 1 is mounted as a drive power source may be used, or a battery electric vehicle in which only the motor 2 is mounted as a drive power source may be used.

In the vehicle Ve shown in FIG. 1, an automatic transmission 5 is connected to an output shaft of a drive power source constituted by an engine 1 and a motor 2 via a torque converter (not shown) or the like. The automatic transmission 5 is configured to appropriately change the ratio of the rotational speed of the output shaft 5a to the rotational speed of the input shaft (not shown), in other words, the gear ratio which is the ratio of the rotational speed of the drive power sources 1 and 2 and the drive wheels 4. Note that the automatic transmission 5 may be a stepped transmission mechanism that changes the conventional gear ratio stepwise, or may be a continuously variable transmission mechanism that changes the gear ratio continuously.

The automatic transmission 5 is provided with a clutch mechanism 6 capable of switching between an engagement state in which torque can be transmitted between the drive power sources 1 and 2 and the drive wheels 4 and a release state in which torque transmission between the drive power sources 1 and 2 and the drive wheels 4 is interrupted. Note that the clutch mechanism 6 may be a clutch mechanism engaged to set a gear shift stage, or may be a so-called starting clutch having only a function of selectively blocking transmission of torque between the drive power sources 1 and 2 and the drive wheels 4.

The clutch mechanism 6 is brought into an engaged state when the hydraulic pressure is supplied, and is brought into a released state when the hydraulic pressure is lowered. It is constituted by a so-called normally-open type hydraulic clutch mechanism, and a hydraulic control device 7 for controlling the hydraulic pressure supplied to the clutch mechanism 6 is provided. The hydraulic control device 7 includes a manual valve 8 for switching the supply of oil from a hydraulic pressure source (not shown) to the clutch mechanism 6, and a shift solenoid valve 9 for increasing or decreasing the hydraulic pressure of the clutch mechanism 6. The manual valve 8 is mechanically connected to a shift lever 13*b* to be described later, and when the shift lever 13*b* is positioned in the parking position and the neutral position, the supply of oil from the hydraulic pressure source to the clutch mechanism 6 is interrupted, and the clutch mechanism 6 is released. In other positions, the clutch mechanism 6 is configured to be engaged by allowing oil to be supplied from a hydraulic pressure source to the clutch mechanism 6.

A pair of drive wheels 4 is connected to the output shaft 5*a* of the automatic transmission 5 via a propeller shaft 10, a differential gear 11, and left and right drive shafts 12. That is, the vehicle Ve illustrated in FIG. 1 is a rear-wheel-driven vehicle having the rear wheels as the drive wheels 4. Note that the vehicle Ve according to the embodiment may be a front wheel drive vehicle in which the front wheels are the drive wheels 4. The vehicle may be a four-wheel drive vehicle in which the output torque of the drive power sources 1 and 2 is distributed to the front wheels and the rear wheels by transfer, and the front wheels and the rear wheels are used as drive wheels. It may be a four-wheel drive hybrid electric vehicle in which either one of the front wheels or the rear wheels is driven by the engine 1 and the other of the front wheels or the rear wheels is driven by the motor 2.

The rear wheels and the front wheels as the drive wheels 4 are provided with braking devices (not shown) that apply braking force to wheels such as disc brakes and drum brakes, respectively. The braking device is configured to generate a braking torque corresponding to a depression amount and a depression force of the brake pedal 3 by the driver. The brake pedal 3 corresponds to a "brake operation unit" in the embodiment of the present disclosure.

Like the conventional vehicle, the vehicle Ve described above is configured to be capable of setting at least four ranges: a parking range (P range) that blocks transmission of torque between the drive power sources 1 and 2 and the drive wheels 4 and locks any rotating member of the torque transmission path including the automatic transmission 5; a reverse range (R range) that transmits torque of the drive power sources 1 and 2 to the drive wheels 4 in a direction in which the vehicle Ve moves backward; a neutral range (N range) that blocks transmission of torque between the drive power sources 1 and 2 and the drive wheels 4; and a drive range (D range) that transmits torque from the drive power sources 1 and 2 to the drive wheels 4 by appropriately changing the gear ratio by the automatic transmission 5.

Figure 2:
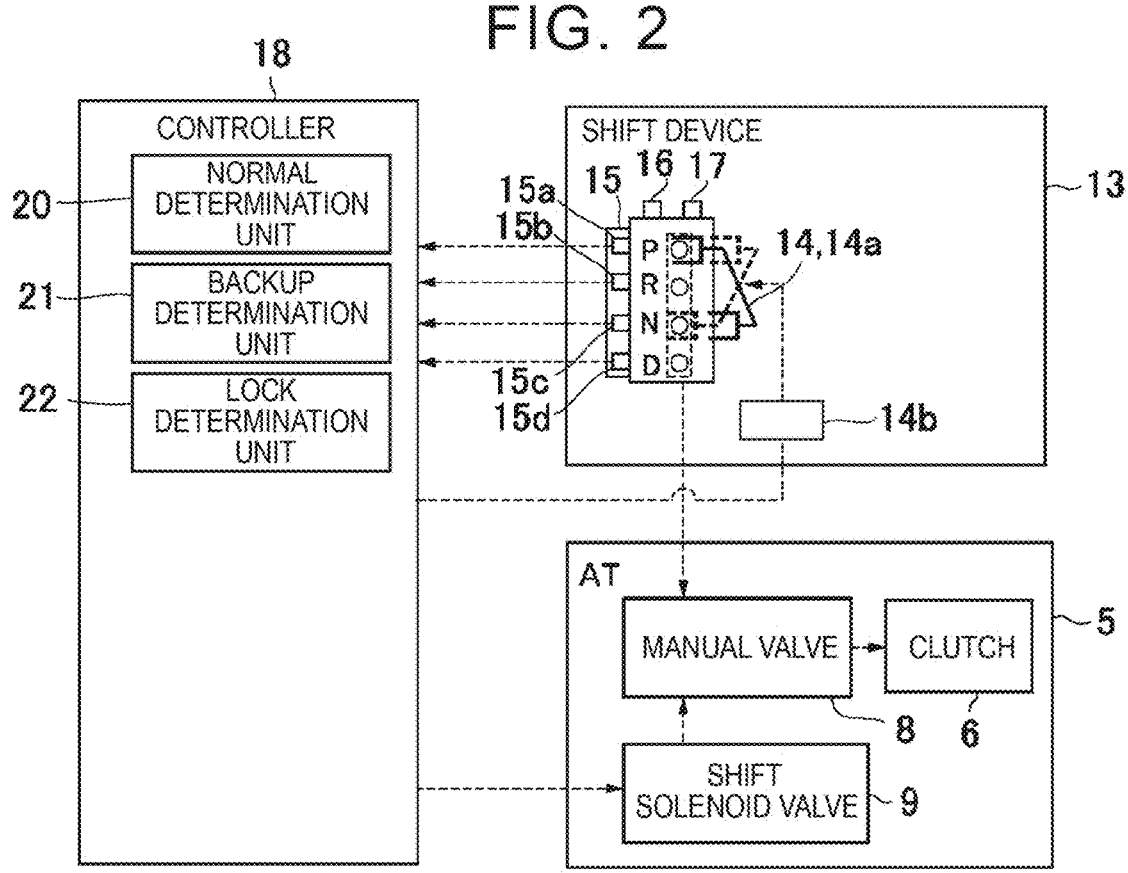
FIG. 2 is a diagram for explaining a configuration of a control device according to an embodiment of the present disclosure, and is a diagram schematically illustrating an example of a control system between a controller and a shift device and an automatic transmission.

Each of the above-described ranges is configured to be switched in accordance with an operation of the shift device 13 by the driver. As shown in FIGS. 1 and 2, the shift device 13 includes a shift gate 13*a* provided in a center console (not shown) or the like, and a shift lever 13*b* that moves the shift gate 13*a*. The shift gate 13*a* is configured such that four positions of a parking position (P position) for selecting a P range, a reverse position (R position) for selecting an R range, a neutral position (N position) for selecting an N range, and a drive position (D position) for selecting a D range are assigned in the above-described order, and the driver operates the shift lever 13*b* to select the range. Note that the R position and the D position correspond to the "traveling position" in the embodiment of the present disclosure, and the shift lever 13*b* corresponds to the "shift operation unit" in the embodiment of the present disclosure.

Further, the shift device 13 is provided with a lock mechanism 14 that selectively switches between a parking position lock (P lock) that regulates or restricts the shift lever 13*b* from moving from the P position to another position as shown in FIG. 2, and a neutral position lock (N lock) that regulates or restricts the shift lever 13*b* from moving from the N position to another position. For example, when the P-lock is selected while the shift lever 13*b* is in a position other than the P position, the shift lever 13*b* is allowed to move. After the shift lever 13*b* moves to the P position with the P lock selected, the shift lever is configured to regulate the movement from the P position to another position.

The lock mechanism 14 includes a linkage 14*a* configured to select one of a P-lock and an N-lock as schematically illustrated in FIG. 2, and a locking solenoid-valve 14*b* for actuating the linkage 14*a*. It is configured to control the locking solenoid valve 14*b* so as to be in a locked condition determined corresponding to the position of the shift lever 13*b*. Note that the lock mechanism 14 only needs to be capable of selectively switching between the P lock and the N lock, and the configuration thereof is not limited to the above-described configuration.

Specifically, as shown in FIG. 3, the P-lock or the N-lock is determined based on the position of the shift lever 13*b* and whether the brake pedal 3 is operated. That is, when the shift lever 13*b* is in the P position and the operation amount of the brake pedal 3 is less than the predetermined amount that can be determined not to be the operation of the brake pedal 3 (brake OFF), it is determined that the P lock is executed (that is, the N lock is released). When the shift lever 13*b* is at the P position and the operation amount of the brake pedal 3 is equal to or greater than the predetermined amount that can be determined to be the operation of the brake pedal 3 (brake ON), it is determined that the P lock is released (that is, the N lock is executed).

Similarly, when the shift lever 13*b* is in the N position and the brake OFF, it is determined that the N lock is executed (that is, the P lock is released), and when the shift lever 13*b* is in the N position and the brake ON, it is determined that the N lock is released (that is, the P lock is executed).

When the shift lever 13*b* is not in the P position or the N position and is in the R position or the D position, the P lock is determined to be executed (that is, the N lock is released) regardless of whether the brake pedal 3 is operated.

That is, when the shift lever 13*b* is positioned at the P position or the N position, the lock mechanism 14 is configured to switch between the P lock and the N lock only when the brake pedal 3 is operated. In other words, when the shift lever 13*b* is positioned at the P position or the N position, the shift lever 13*b* is regulated or restricted unless the brake pedal 3 is operated.

Therefore, a sensor for detecting the position of the shift lever 13*b* is provided. In the embodiment shown in FIG. 2, a plurality of electrical contacts 15 assigned for each position in order to individually determine the position of the shift lever 13*b*, a neutral switch (hereinafter, referred to as NSW) 16 for outputting an ON signal when the shift lever 13*b* is positioned at one of the P position and the N position, and a parking switch (hereinafter, referred to as PSW) 17 for outputting an ON signal when the shift lever 13*b* is at the P position and a button (not shown) provided at the knob at the end of the shift lever 13*b* is not pressed is provided. This NSW16 corresponds to the "first switch" in the embodiment of the present disclosure, and PSW17 corresponds to the "second switch" in the embodiment of the present disclosure.

The electrical contact 15 includes a parking contact (P contact) 15a for outputting an ON signal when the shift lever 13b is positioned at the P position, a reverse contact (R contact) 15b for outputting an ON signal when the shift lever 13b is positioned at the R position, a neutral contact (N contact) 15c for outputting an ON signal when the shift lever 13b is positioned at the N position, and a driving contact (D contact) 15d for outputting an ON signal when the shift lever 13b is positioned at the D position. Therefore, when the driver operates the shift lever 13b, only the electrical contact 15 corresponding to the position of the shift lever 13b is turned on. The R contact 15b and the D contact 15d correspond to the "running contact" in the embodiment of the present disclosure.

The vehicle Ve is configured such that a starter motor (not shown) for starting the engine 1 can be operated only when the shift lever 13b is positioned at one of the P position and the N position. NSW16 is an existing-switch that is provided to determine whether or not to allow the starter motor to operate. In addition, PSW17 is a conventional switch provided in the shift lever 13b for detecting the P-locked state.

An electronic control unit (hereinafter referred to as a "controller") 18 is provided which is configured to control the lock mechanism 14, the shift solenoid valve 9, and the like by inputting the above-described electrical contacts 15, NSW16, and PSW17 signals and determining the position of the shift lever 13b based on the input signals.

The controller 18 can be constituted mainly by a microcomputer, similar to a controller provided in a conventional vehicle, and receives signals from various sensors provided in the vehicle Ve. In the embodiments illustrated in FIGS. 1 and 2, the controller 18 is configured to receive signals from a wheel speed sensor 19a for detecting the rotational speed of the drive wheels 4, an engine speed sensor 19b for detecting the rotational speed of the engine 1, a resolver 19c for detecting the rotational angle of the motor 2, a brake sensor 19d for detecting the depression amount and the depression force of the brake pedal 3, an electrical contact 15, a NSW16, and a PSW17.

The controller 18 illustrated in FIG. 2 includes a normal determination unit 20, a backup determination unit 21, and a lock determination unit 22. The normal determination unit 20 is configured to determine a shift position based on a signal input from the electrical contact 15. Specifically, the shift position determination map shown in FIG. 4 is stored in the normal determination unit 20, and the shift position is determined based on the shift position determination map and a signal from the input electrical contact 15.

That is, when the ON signal is input only from the P contact 15a, the shift position is determined as the P position, and when the ON signal is input only from the R contact 15b, the shift position is determined as the R position. When the ON signal is input only from the N contact 15c, the shift position is determined as the N position, and when the ON signal is input only from the D contact 15d, the shift position is determined as the D-position.

In addition, when the signal input from the electrical contact 15 does not correspond to any of the signals shown in FIG. 4, that is, when an ON signal is input from the plurality of electrical contacts 15 for some reason or when an ON signal is not input from any of the electrical contacts 15, it is determined that the signal is undefined. That is, it is determined that no shift position is established. Therefore, the locked state by the lock mechanism 14 is maintained.

The backup determination unit 21 is configured to determine whether or not the position of the shift lever 13b is the N-position based on the signals of NSW16 and PSW17 when the on-signal is not outputted from the electrical contact 15 for some reason. Specifically, when the ON signal is not output from PSW17 and the ON signal is output from NSW16, it is determined whether or not the position of the shift lever 13b is the N position.

Therefore, the backup determination unit 21 includes a PSW history updating map for storing the operating history of the shift lever 13b to the P position. FIG. 5 shows an exemplary PSW history updating map. In the embodiment illustrated in FIG. 5, the P position flag indicating the P position is switched to ON when the ON signal is output from the P contact 15a and when the ON signal is output from PSW17.

When the ON signal is output from either the R contact 15b or the D contact 15d and the ON signal is not output from the P contact 15a or PSW17, the P position flag is switched off regardless of the output signal from the N contact 15c or NSW16.

Furthermore, when the ON signal is output from the N-contact 15c and NSW16 and the ON signal is not output from the P-contact 15a or PSW17, the P-position flag is switched off regardless of the output signal from the R contact 15b or the D-contact 15d. When the electrical contact 15 or NSW16 does not correspond to the condition for turning on the P position flag or the condition for turning off the P position flag shown in FIG. 5, it is determined that the P position flag is undefined, and the ON state or the OFF state of the P position flag is maintained. PSW history update map corresponds to a "parking history update map" in the embodiment of the present disclosure.

Then, the lock determination unit 22 determines to set either the P lock or the N lock by the lock mechanism 14 based on the position of the shift lever 13b determined by the normal determination unit 20 or the backup determination unit 21.

FIG. 6 is a flowchart for explaining an example of control executed by the controller 18. In the control illustrated in FIG. 6, first, the P-position flag is read (S1). Specifically, since the P position flags are sequentially updated based on PSW history update map stored in the backup determination unit 21, S1 reads the P position flags.

Then, it is determined whether or not an on-signal is inputted from any one of the electrical contacts 15 (S2). When the positive determination is made in S2 due to the ON signal being input from any one of the electrical contacts 15, the normal determination unit 20 determines the shift position based on the input ON signal of the electrical contact 15 (S3). That is, the shift position is determined based on the input electrical contact 15 and the shift position determination map stored in the normal determination unit 20.

On the contrary, when it is determined negatively in S2 because the on-signal is not input from all the electrical contacts 15, the backup determination unit 21 determines the shift position based on the input P position flag and the signal from NSW16, in other words, based on NSW16 and PSW17 (S4). That is, when the P position flag read by S1 is off and the on-signal is inputted from NSW16, the shift position is determined to be the N position. Further, for example, when the P position flag is ON, the shift position is determined as the P position regardless of whether or not an ON signal is inputted from NSW16.

Note that the control example shown here is a control example in which a failure in which any of the electrical contacts 15 is not turned on occurs. Therefore, for example, when the ON signal is input from the plurality of electrical contacts 15, or when the P position flag is OFF and the ON signal is not input from NSW16, it is assumed that the shift position is determined by other control or the like.

Then, a S5 for determining whether or not the shifted position determined by S3 or S4 is the N position is performed. If a positive determination is made in S5 due to the shift position being the N position, it is determined whether or not the brake pedal 3 is not operated (S6). If S6 is determined to be positive because the brake pedal is not operated, the lock mechanism 14 performs N-lock (that is, releases P-lock) (S7). If a negative determination is made by S6 due to the brake pedal 3 being operated, the lock mechanism 14 releases the N lock (i.e., executes the P lock) (S8), and the routine is terminated once.

On the other hand, when the shift position determined by S3 or S4 is not the N position and thus is determined negatively in S5, it is determined whether or not the shift position is the P position (S9). If a negative determination is made in S9 because the position is not the P position, the lock mechanism 14 releases the N lock (i.e., performs the P lock) (S8), and the routine is terminated once.

On the contrary, if the shift position is determined positively in S9 by the shift position being the P position, it is determined whether or not the brake pedal 3 is not operated (S10). Then, when the brake pedal 3 is operated and thus a negative determination is made in S10, the lock mechanism 14 executes N-lock (that is, releases P-lock) (S7). If a positive determination is made in S10 because the brake pedal 3 is not operated, the lock mechanism 14 releases the N lock (i.e., executes the P lock) (S8), and the routine is terminated once.

According to the above-described control example, for example, in a state where the shift lever 13b is positioned at the N position, in a case where a failure in which the ON signal is not output from the N contact 15c occurs, or in a case where a failure in which the ON signal is not output from the P contact 15a occurs in a state where the shift lever 13b is positioned at the P position, in a case where the ON signal is not input from all the electrical contacts 15 to the controller 18, the shift position is determined based on the signal of NSW16 or PSW17.

Therefore, even when a failure occurs in which the on-state signal cannot be outputted from the electrical contact 15 for detecting the shift position, at least the P position and the N position can be determined based on the signal inputted from NSW16 or PSW17 to the controllers 18. That is, it is possible to appropriately switch the lock status (P lock or N lock) of the lock mechanism 14 due to the shift lever 13b being positioned at the P position or the N position. Therefore, it is possible to suppress the shift lever 13b from moving from the P position or the N position to another shift position without operating the brake pedal 3.

What is claimed is:

1. A control device of a vehicle that includes
a shift operation unit for selecting a plurality of shift positions including a parking position, a neutral position, and a drive position,
a plurality of electrical contacts including a parking contact that is turned on when the shift operation unit is in the parking position, a neutral contact that is turned on when the shift operation unit is in the neutral position, and a drive contact that is turned on when the shift operation unit is in the drive position,
a lock mechanism that is configured to be switchable between a parking position lock that regulates or restricts switching of the shift operation unit from the parking position to another shift position, and a neutral position lock that regulates or restricts switching of the shift operation unit from the neutral position to another shift position, and
a brake operation unit that is operated by a driver to apply a braking force to wheels, in which the lock mechanism is configured to disengage the parking position lock or the neutral position lock that is set, by operating the brake operation unit, the control device comprising:
a first switch that is turned on when the shift operation unit is at the parking position or the neutral position;
a second switch that is only turned on when the shift operation unit is in the parking position; and
a controller that controls the locking mechanism in accordance with the shift position, the controller including
a normal determination unit that, when an on signal is output from any one of the electrical contacts, determines the shift position of the shift operation unit based on the on signal of the electrical contact, and
a backup determination unit that, when an on signal is not output from any of the electrical contacts, determines the shift position of the shift operation unit based on signals of the first switch and the second switch.

2. The control device according to claim 1, wherein, when an on signal is output from the first switch and also an on signal is not output from the second switch, the backup determination unit determines that the shift operation unit is in the neutral position.

3. The control device according to claim 1, wherein:
the backup determination unit includes a parking history update map, in which an operation history of the shift operation unit being operated to the parking position is stored when the parking contact is on or when the second switch is on, and from which the operation history is deleted when the parking contact and the second switch are off and also the drive contact is on, or when the parking contact and the second switch are off and also the first switch and the neutral contact are on, and
the backup determination unit determines the shift position of the shift operation unit based on the operation history that is stored based on the parking history update map, and on a signal input from the first switch.

4. The control device according to claim 1, wherein the controller further includes a lock determination unit that is configured to disengage one of the parking position lock and the neutral position lock by the lock mechanism, based on the shift position determined based on either the normal determination unit or the backup determination unit, and presence or absence of an operation of the brake operation unit, and also to execute the other of the parking position lock and the neutral position lock.

* * * * *